(12) United States Patent
Rai

(10) Patent No.: US 7,999,956 B2
(45) Date of Patent: Aug. 16, 2011

(54) SYSTEM AND METHOD FOR IMPROVING PRINT SHOP OPERATION

(75) Inventor: Sudhendu Rai, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 1132 days.

(21) Appl. No.: 11/541,018

(22) Filed: Sep. 29, 2006

(65) Prior Publication Data

US 2008/0079988 A1 Apr. 3, 2008

(51) Int. Cl.
  G06K 3/12 (2006.01)
  G06F 3/12 (2006.01)
  G06F 15/00 (2006.01)
  G06F 15/173 (2006.01)

(52) U.S. Cl. ............. 358/1.15; 358/1.13; 358/1.16; 358/1.9; 709/223; 709/224; 709/225; 709/226

(58) Field of Classification Search ........... 358/1.13, 358/1.15; 709/223
See application file for complete search history.

(56) References Cited

U.S. PATENT DOCUMENTS

| | | | |
|---|---|---|---|
| 4,121,818 A | 10/1978 | Riley et al. | |
| 6,222,642 B1 * | 4/2001 | Farrell et al. | 358/1.9 |
| 6,594,388 B1 * | 7/2003 | Gindele et al. | 382/167 |
| 6,597,469 B1 * | 7/2003 | Kuroyanagi | 358/1.15 |
| 6,738,155 B1 * | 5/2004 | Rosenlund et al. | 358/1.15 |
| 6,805,502 B2 * | 10/2004 | Rai et al. | 400/61 |
| 6,952,801 B2 * | 10/2005 | Warmus et al. | 715/251 |
| 7,024,580 B2 * | 4/2006 | Guimbellot et al. | 714/1 |
| 7,064,848 B2 * | 6/2006 | Jackson et al. | 358/1.13 |
| 7,065,567 B1 * | 6/2006 | Squires et al. | 709/223 |
| 7,079,266 B1 * | 7/2006 | Rai et al. | 358/1.13 |
| 7,345,781 B2 * | 3/2008 | Beckman et al. | 358/1.15 |
| 7,542,161 B2 * | 6/2009 | Lin et al. | 358/1.15 |
| 2002/0124756 A1 * | 9/2002 | Rai et al. | 101/484 |
| 2002/0129081 A1 * | 9/2002 | Rai et al. | 709/102 |
| 2003/0149747 A1 * | 8/2003 | Rai et al. | 709/219 |
| 2004/0187113 A1 * | 9/2004 | Viassolo | 718/100 |
| 2005/0065830 A1 * | 3/2005 | Duke et al. | 705/7 |
| 2005/0151993 A1 * | 7/2005 | Gartstein et al. | 358/1.15 |
| 2006/0132823 A1 * | 6/2006 | Sakamoto | 358/1.14 |
| 2009/0128856 A1 * | 5/2009 | Rai et al. | 358/1.15 |

* cited by examiner

*Primary Examiner* — Chan S Park
*Assistant Examiner* — Hilina S Kassa
(74) *Attorney, Agent, or Firm* — Fay Sharpe LLP

(57) ABSTRACT

There is provided a system for a print production facility, with print job processing departments, in which a wait time interval is determined for each recorded instance in which an output, from a set of multiple outputs, is delivered from a first one of the print job processing departments to a second one of the print job processing departments. A statistical metric value, representative of a wait time interval for the set of multiple outputs, is computed, and a workflow relationship between the print job processing departments may be altered when a total number of recorded instances and/or the statistical metric value exceed given references.

18 Claims, 7 Drawing Sheets

| Job Number | Cost Center | Quantity | Employee Code | Cost | Start Time | End Time | Start Date | End Date |
|---|---|---|---|---|---|---|---|---|
| 136619 | PRWBWUW | 30,000.00 | | 0.00 | 0711 | 0711 | 20040102 | 20040102 |
| C237911 | BDCUFT1 | 1,000.00 | | 0.00 | 0743 | 0743 | 20031118 | 20031118 |
| C232188 | CCJSTBL | 11,082.00 | | 0.00 | 1253 | 1253 | 20031201 | 20031201 |
| W000109A | PR20MR2 | 500.00 | | 0.00 | 1007 | 1007 | 20040402 | 20040402 |
| LOGIND | LOLOLOG | 1.00 | 000 | 0.00 | 1200 | 1200 | 20030821 | 20030821 |
| LOGIND | LOLOLOG | 1.00 | 000 | 0.00 | 1244 | 1244 | 20030822 | 20030822 |
| NC0803 | PRNCEQD | 1.00 | 000 | 0.00 | 1200 | 1200 | 20030821 | 20030821 |
| NC0803 | PRNCEQD | 1.00 | 000 | 0.00 | 1200 | 1200 | 20030822 | 20030822 |
| LOGIND | LOLOLOG | 1.00 | A06 | 0.00 | 0815 | 0815 | 20030723 | 20030723 |
| LOGIND | LOLOLOG | 1.00 | A06 | 0.00 | 0847 | 0847 | 20030725 | 20030725 |
| 133067 | BDFLMR1 | 3,400.00 | ALW | 37.56 | 1005 | 1041 | 20030730 | 20030730 |
| 133067 | BDFLRT1 | 3,400.00 | ALW | 18.78 | 1136 | 1154 | 20030730 | 20030730 |
| 133519 | BDFLRT1 | 1,000.00 | ALW | 0.00 | 1233 | 1233 | 20030808 | 20030808 |
| 133519 | BDFLRT1 | 1,000.00 | ALW | 30.26 | 1233 | 1302 | 20030808 | 20030808 |
| 134104 | BDFLMR1 | 4,500.00 | ALW | 75.12 | 1203 | 1315 | 20037002 | 20037002 |
| 134104 | BDFLRT1 | 4,500.00 | ALW | 75.12 | 1203 | 1315 | 20030702 | 20030702 |
| 134127 | BDFLMR1 | 2,000.00 | ALW | 43.82 | 1256 | 1338 | 20030701 | 20030701 |
| 134127 | BDFLRT1 | 2,000.00 | ALW | 31.30 | 1256 | 1326 | 20030701 | 20030701 |
| 134153 | BDFLRT1 | 1,200.00 | ALW | 18.78 | 1130 | 1148 | 20030701 | 20030701 |
| 134178 | BDFLMR1 | 4,550.00 | ALW | 43.82 | 1903 | 1945 | 20030717 | 20030717 |
| 134178 | BDFLRT1 | 4,550.00 | ALW | 112.68 | 1945 | 2133 | 20030717 | 20030717 |
| 134178 | BDFLRT1 | 4,550.00 | ALW | 187.80 | 1459 | 1759 | 20030718 | 20030718 |

*FIG. 2*

Cost Codes: Table

| ID | Departm | Department Des | Category | Category Descriptio | Cost Center | Aggregate Field | Cost Center Description | Type |
|---|---|---|---|---|---|---|---|---|
| 1 | BD | Bindery | BD | Bindery | HT1 | BDBDHT1 | Handtime Bindery | L |
| 2 | BD | Bindery | CU | Cutting | FT1 | BDCUFT1 | Finish Cutting | L |
| 3 | BD | Bindery | CU | Cutting | HL1 | BDCUHL1 | Cutter Helper | L |
| 4 | BD | Bindery | CU | Cutting | PT1 | BDCUPT1 | Pre-press Cutting | L |
| 5 | BD | Bindery | DP | Duplo Collator | MR1 | BDDPMR1 | Duplo Collator MakeReady | L |
| 6 | BD | Bindery | DP | Duplo Collator | RT1 | BDDPRT1 | Duplo Collator Run Time | L |
| 7 | BD | Bindery | DR | Drills | MR1 | BDDRMR1 | Drills MakeReady | L |
| 8 | BD | Bindery | DR | Drills | RT1 | BDDRRT1 | Drills Run Time | L |
| 9 | BD | Bindery | FL | Folders | HL1 | BDFLHL1 | Folder Helper | L |
| 10 | BD | Bindery | FL | Folders | MR1 | BDFLMR1 | Folders MakeReady | L |
| 11 | BD | Bindery | FL | Folders | RT1 | BDFLRT1 | FolderS Run Time | L |
| 12 | BD | Bindery | HS | Handstitcher | RT1 | BDJSRT1 | Handstitch Runtime | L |
| 13 | BD | Bindery | HT | Hand time | HT1 | BDHTHT1 | Bindery Hand Time | L |
| 14 | BD | Bindery | HT | Hand time | LAM | BFHTLAM | Laminating | L |
| 15 | BD | Bindery | ML | Mail | OUT | BDMLOUT | Out of Bindery | M |
| 16 | BD | Bindery | MT | Bindery Materials | 701 | BDMT701 | Chipboard 8.5x11 | M |
| 17 | BD | Bindery | MT | Bindery Materials | 704 | BDMT704 | Chipboard 11x17 | M |
| 18 | BD | Bindery | MT | Bindery Materials | 705 | BDMT705 | 9 1/4x11 CORRIGATD | M |
| 19 | BD | Bindery | MT | Bindery Materials | ADJ | BDMTADJ | Adjustment | L |
| 20 | BD | Bindery | NC | Non-Chargeable | GWK | BDNCGWK | General Work | L |
| 21 | BD | Bindery | NC | Non-Chargeable | MTG | BDNCMTG | Meeting | L |
| 22 | BD | Bindery | NC | Non-Chargeable | NCG | BDNCNCG | Non-Chargeable Time | L |
| 23 | BD | Bindery | NC | Non-Chargeable | R&M | BDNCR&M | Repair&Maintenance | L |
| 24 | BD | Bindery | PB | PERFECT BINDER | MR1 | BDPBMR1 | PERFCT BDRMAKERDY | L |

| Job ID | Departme | Start Time | Job ID | Departme | Stop Time |
|---|---|---|---|---|---|
| 132836 | GD | 7/23/2003 8:57 | 132836 | GD | 7/23/2003 9:57 |
| 132836 | PP | 7/28/2003 11:11 | 132836 | PP | 7/30/2003 8:46 |
| 132836 | PR | 7/30/2003 9:41 | 132836 | PR | 7/30/2003 12:01 |
| 132836 | BD | 7/31/2003 4:30 | 132836 | BD | 7/31/2003 21:31 |
| 132836 | ZS | 8/4/2003 3:18 | 132836 | ZS | 8/4/2003 10:15 |
| 133067 | GD | 7/23/2003 0:57 | 133067 | GD | 7/25/2003 14:16 |
| 133067 | PP | 7/28/2003 6:20 | 133067 | PP | 7/31/2003 13:23 |
| 133067 | BD | 7/28/2003 16:30 | 133067 | BD | 8/1/2003 21:28 |
| 133067 | PR | 7/29/2003 9:53 | 133067 | PR | 7/31/2003 18:39 |
| 133067 | ML | 7/30/2003 15:00 | 133067 | ML | 8/4/2003 11:36 |
| 133067 | ZS | 8/4/2003 11:08 | 133067 | ZS | 8/4/2003 11:37 |
| 133353 | IS | 7/9/2006 11:17 | 133353 | IS | 7/14/2006 14:40 |
| 133353 | ML | 7/10/2006 6:00 | 133353 | ML | 7/16/2006 23:33 |

| Job ID | Departme | Start Time | Job ID | Departme | Stop Time | Delta T | Count | Wait Time | Transit Code |
|---|---|---|---|---|---|---|---|---|---|
| 132836 | GD | 7/23/2003 8:57 | 132836 | GD | 7/23/2003 9:57 | 0.5 | 5 | | |
| 132836 | PP | 7/28/2003 11:11 | 132836 | PP | 7/23/2003 8:46 | 45.25 | 5 | 73.2333 | GD->PP |
| 132836 | PR | 7/30/2003 9:41 | 132836 | PR | 7/30/2003 12:01 | 2.333333 | 5 | 0.916667 | PP->PR |
| 132836 | BD | 7/31/2003 4:30 | 132836 | BD | 7/31/2003 21:31 | 17.01667 | 5 | 16.31667 | PR->BD |
| 132836 | ZS | 8/4/2003 3:18 | 132836 | ZS | 8/4/2003 10:15 | 6.95 | 5 | 29.45 | BD->ZS |
| 133067 | GD | 7/23/2003 0:57 | 133067 | GD | 7/25/2003 14:16 | 60.98333 | 6 | | |
| 133067 | PP | 7/28/2003 6:20 | 133067 | PP | 7/31/2003 13:23 | 78.55 | 6 | 15.9 | GD->PP |
| 133067 | BD | 7/28/2003 16:30 | 133067 | BD | 8/1/2003 21:28 | 100.3 | 6 | -116.05 | PP->BD |
| 133067 | PR | 7/29/2003 9:53 | 133067 | PR | 7/31/2003 18:39 | 56.43333 | 6 | -130.75 | BD->PR |
| 133067 | ML | 7/30/2003 15:00 | 133067 | ML | 8/4/2003 11:36 | 68.1 | 6 | -75.15 | PR->ML |
| 133067 | ZS | 8/4/2003 11:08 | 133067 | ZS | 8/4/2003 11:37 | 0.483333 | 6 | -0.466667 | ML->ZS |
| 133353 | IS | 7/9/2006 11:17 | 133353 | IS | 7/14/2006 14:40 | 74.88333 | 5 | | |
| 133353 | ML | 7/10/2006 6:00 | 133353 | ML | 7/16/2006 23:33 | 112.8833 | 5 | -104 | IS->ML |
| 133353 | CC | 7/15/2003 8:09 | 133353 | CC | 7/15/2003 9:05 | 0.933333 | 5 | -86.9 | ML->CC |
| 133353 | BD | 7/15/2003 8:55 | 133353 | BD | 7/15/2003 10:23 | 1.466667 | 5 | -0.166667 | CC->BD |
| 133353 | ZS | 7/16/2003 1:42 | 133353 | ZS | 7/16/2003 11:29 | 9.783333 | 5 | 15.15 | BD->ZS |
| 133476 | IS | 7/1/2003 7:52 | 133476 | IS | 7/3/2003 12:44 | 52.53333 | 5 | -313.45 | ZS->IS |
| 133476 | CC | 7/3/2003 13:29 | 133476 | CC | 7/3/2003 14:36 | 1.116667 | 5 | 0.75 | IS->CC |
| 133476 | BD | 7/7/2003 7:43 | 133476 | BD | 7/7/2003 8:02 | 0.316667 | 5 | 40.78333 | CC->BD |
| 133476 | ML | 7/7/2003 11:53 | 133476 | ML | 7/7/2003 14:00 | 2.116667 | 5 | 3.85 | BD->ML |
| 133476 | ZS | 7/7/2003 15:33 | 133476 | ZS | 7/7/2003 15:51 | 0.3 | 5 | 1.55 | ML->ZS |
| 133519 | GD | 7/23/2003 9:27 | 133519 | GD | 7/31/2003 16:35 | 150.1333 | 5 | 279.6 | ZS->GD |
| 133519 | PP | 7/31/2003 7:32 | 133519 | PP | 8/5/2003 12:19 | 76.28333 | 5 | -9.05 | GD->PP |

| Dept-To-Dept | Median Time Spent Waiting Between Departments | No. of Instances |
|---|---|---|
| PR-PP | 2.2 | 21 |
| PS-ZS | 2.5 | 12 |
| BD-ZM | 2.6 | 11 |
| BD-PS | 2.6 | 31 |
| IS-CC | 3.2 | 327 |
| BD-ML | 4.0 | 142 |
| BD-FL | 5.1 | 12 |
| CC-ML | 6.0 | 65 |
| IS-ML | 6.4 | 22 |
| ML-ZS | 9.3 | 210 |
| BD-ZS | 10.4 | 2652 |
| FL-ZS | 12.6 | 15 |
| CC-ZS | 13.0 | 1492 |
| CC-BD | 15.2 | 1100 |
| PP-PR | 17.9 | 903 |
| CC-PP | 17.9 | 34 |
| PR-BD | 19.5 | 1008 |
| GD-CC | 19.8 | 29 |
| PP-BD | 20.5 | 125 |
| PP-ML | 24.1 | 29 |
| BD-PP | 25.8 | 45 |
| IS-BD | 28.4 | 179 |
| PP-ZS | 28.5 | 244 |
| CC-PR | 31.8 | 11 |
| CC-GD | 33.5 | 17 |
| PR-ZS | 34.6 | 1143 |
| GD-PP | 37.0 | 72 |
| GD-PR | 37.7 | 20 |
| CC-IS | 38.4 | 54 |
| PA-ZS | 40.0 | 14 |
| BD-IS | 41.5 | 21 |
| PA-BD | 41.8 | 16 |
| BD-PR | 42.0 | 73 |
| PP-CC | 43.2 | 51 |
| PR-ML | 43.8 | 76 |
| IS-ZS | 46.2 | 219 |
| GD-BD | 50.4 | 43 |
| GD-ZS | 58.8 | 37 |
| PS-FL | 70.0 | 27 |
| PR-CC | 98.6 | 11 |

SYSTEM AND METHOD FOR IMPROVING PRINT SHOP OPERATION

RELATED APPLICATION

Cross-reference is made to the following co-pending, commonly assigned application: U.S. patent application Ser. No. 11/541,018, filed on Sep. 29, 2006, by Sudhendu Rai, entitled "SYSTEM AND METHOD FOR IMPROVING PRINT SHOP OPERATION."

BACKGROUND

The disclosed embodiments relate to a system and method for improving the operation of a print shop arranged in multiple departments and, more particularly, to an approach in which information about print job flow among the departments is used to ensure, for example, that the departments are suitably arranged relative to one another.

Some important steps for producing printed materials using a plate process include (1) preparing copy elements for reproduction, (2) prepress production, (3) plate-making, (4) printing, and (5) binding, finishing and distribution.

In this printing production process, an "end user", such as, publishers, direct marketers, advertising agencies, and corporate communication departments, prepares copy elements for reproduction. In this "design" stage of the printing process, the end user provides images and data using slides or computer files to create one or more "pages". Pages can be designed using computer programs such as QuarkXpress or other publishing software packages. Slides or computer disks containing pages to be printed are sent (via mail or express carrier) to be prepared for creation of a plate.

In the prepress production stage, the end user input (or "copy") is transformed into a medium that is reproducible for printing. Typically, prepress involves typesetting, illustration, page building and design, image capture, image color correction, file conversion, RIPing, trapping, proofing, imposition, filmsetting, and platesetting. "Proofing" involves producing a proof, or sample, of what the printed product will look like. The proof is sent by mail or express carrier to the end user for review and approval. After alterations are made, new proofs are sent to the end user. Once approval of the proof is given by the end user, a medium, such as a computer to plate (CTP) file is produced and sent to the printer. "Imposition" involves the set of pages on a particular plate as well as their positioning and orientation. Imposition is particularly important in the creation of booklets or catalogs, where pages are positioned using register marks to assist in the stripping, collating, and folding of the printed product.

In the platemaking stage, a "printer" manufactures a printing plate using the medium created during prepress. Where a CTP file is used, the printer converts the CTP file into a printing plate or goes directly to a digital press. In the printing stage, the printer uses the printing plate to create the printed product. In the binding, finishing and distribution stage, the printed product is prepared in its final form.

Each step of the printing production process described briefly above can be accomplished using a variety of different known systems and techniques. For instance, conventional bookmaking processes are described in the following patents: U.S. Pat. No. 4,121,818 to Riley et al., U.S. Pat. No. 6,738,155 to Rosenlund et al., and U.S. Pat. No. 6,952,801 to Warmus et al., the pertinent portions of which patents are incorporated herein by reference. As is known, the steps of the printing production process, which may include many more steps than alluded to above, can be performed in a print facility or shop in which various functions (such as graphic development, prepress, make-ready operations, collation, and binding, just to name a few) are distributed respectfully across dedicated departments.

Pursuant to the departmental approach, work (in the form of print jobs) may be staged in staging areas or buffers between departments. In one example, a print job is printed in a printing department, to form a group of print sets, and then staged before a finishing department in anticipation of one or more binding operations. That is, the print job encounters a waiting period at a departmental interface. When finishing resources for the print job become available, the group of print sets is picked up for processing.

It has been found that a significant amount of time can be lost in staging a given print job between departments, i.e., waiting for the given print job to be moved from one department to another. It would be desirable to provide a system that minimizes, or at least reduces, the waiting time associated with staging print jobs between departments.

SUMMARY OF DISCLOSED EMBODIMENTS

In accordance with one aspect of the disclosed embodiments there is provided a system for use in a print production facility having a first print job processing department separated spatially from a second print job processing department. In practice, a set of print jobs are processed at the first print job processing department to obtain a set of multiple outputs and each one of the multiple outputs is delivered individually from the first print job processing department to the second print job processing department for processing at the second print job processing department. A workflow relationship exists between the first print job processing department and the second print job processing department. The system includes: a print job delivery tracking tool for determining a wait time interval for each instance in which one of the outputs is delivered from the first print job processing department to the second print job processing department; a memory for storing a total number of determined instances with their corresponding wait time intervals; a processor for computing, with the stored wait time intervals, a statistical metric value representative of a wait time interval for the outputs. When the total number of determined instances and the statistical metric value exceeds selected reference values, an indication to alter the workflow relationship of the first and second print job processing departments is provided.

In accordance with another aspect of the disclosed embodiments there is provided a method for use in a print production facility having a first print job processing department separated spatially from a second print job processing department. In practice, a set of print jobs are processed at the first print job processing department to obtain a set of multiple outputs and each one of the multiple outputs is delivered individually from the first print job processing department to the second print job processing department for processing at the second print job processing department. A workflow relationship exists between the first print job processing department and the second print job processing department. The method includes: determining a wait time interval for each instance in which one of the multiple outputs is delivered from the first print job processing department to the second print job processing department, wherein each wait time interval is defined by a difference between completing processing one of the multiple outputs at the first print job processing department and beginning processing of the same one of the multiple outputs at the second print job processing department; for a data set of at least two wait time intervals and a corresponding number of instances, computing a statistical metric value representative of a wait time interval for the set of multiple outputs; and providing an indication to alter the workflow relationship of the first and second print job processing departments when the total number of determined instances and the statistical metric value exceed selected reference values.

In yet another embodiment, the functionality of the method summarized immediately above may be provided by way of an article of manufacture for a print production facility. The article of manufacture includes computer usable media having embedded computer readable instructions. By reference to the embedded instructions, a computer can perform the method.

By way of example, disclosed embodiments are described with reference to the accompanying drawings, in which:

FIG. 2 is a planar view of a dialog screen with data extracted from a conventional database, the database being operatively associated with the print shop of FIG. 1;

FIG. 3 is a planar view of a dialog screen showing information describing various cost centers in the print shop of FIG. 1;

FIG. 4 is a planar view of a dialog screen showing start and stop times for selected print jobs in a given print shop or factory;

FIG. 5 is a planar view of a dialog screen showing wait times, calculated with an automated tool, for the print jobs shown on the screen of FIG. 4;

FIG. 6 is a planar view of a dialog screen showing data analysis of transitions between the various departments of the given print shop of FIG. 4.

Figure 1:
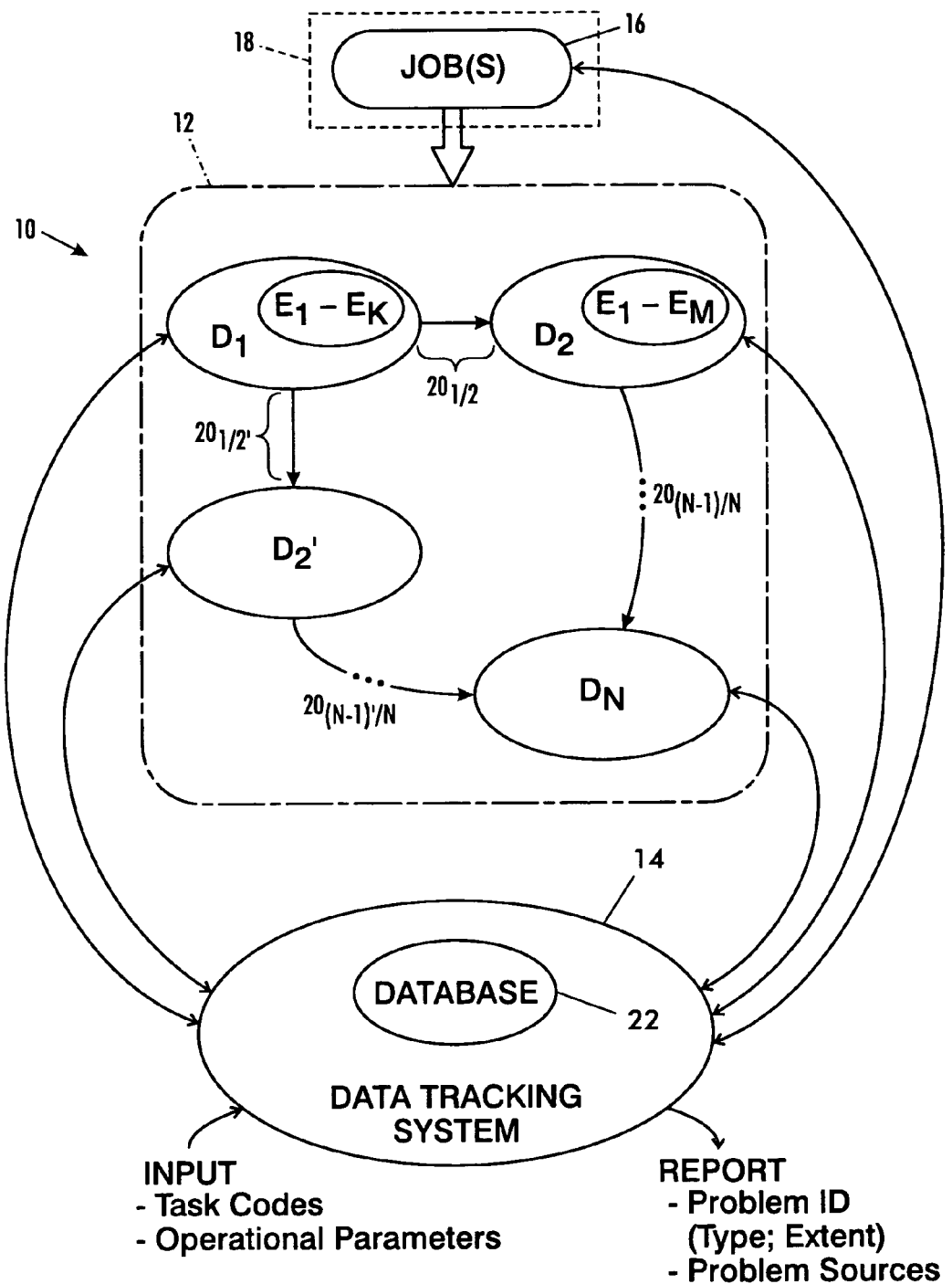
FIG. 1 is a block diagram illustrating selected portions of a print production facility (e.g., print shop), and demonstrating some of the job flow issues associated with the disclosed embodiments.

Referring now to FIG. 1, a document production platform, on which much of the methodology described below can be implemented, is designated by the numeral 10. The print production platform 10 includes a print facility 12 communicating with a data tracking system 14. As contemplated, the tracking system 14 is operatively associated with or implemented on a conventional server (not shown). Additionally, much of the code associated with or implemented for the tracking system can be provided in portable or non-portable form. Hence, one or more applications can be provided to the above-mentioned server in the form of installed mass memory, such as disk drive, or by way of portable machine readable memory medium, such as a CD or DVD.

In one exemplary embodiment, one or more jobs, (in hardcopy or electronic form) designated by the numeral 16 are buffered in memory 18. It should be understood that "memory," as that term is used herein, refers to all forms of storage, including volatile as well as non-volatile memory. Moreover, as contemplated, the memory includes all forms of memory, including portable and non-portable forms of memory. The buffered jobs can then be communicated to the print facility (via, for example, a network) for processing with one of several known print job processing techniques. An example of one such technique is disclosed in U.S. patent application Ser. No. 10/052,505 to Rai et al. (filed on Jan. 11, 2002, and published as 20030149747 on Aug. 7, 2003), the pertinent portions of which are incorporated herein by reference.

In the example of FIG. 1, the print production facility or shop 12 is a production facility with multiple departments, each department being designated in the form of "$D_i$," where $i=1, 2, 2', \ldots N$. Each department typically corresponds with a print job processing capability, and at least some of that capability is made possible through use of one or more pieces of print job processing equipment (e.g., "$E_1$-$E_k$"). It follows that pieces of equipment can be grouped to provide one or more print job processing functions. As is known, in a typical departmental production environment, a given print job might be delivered from one department to another for the sake of executing a selected function with respect to each department. For instance, an offset prepress function may be provided for a job at $D_1$, offset printing may be performed at $D_2$, and binding may occur at $D_N$.

As will be appreciated by those skilled in the art, while only four departments are shown in FIG. 1, the value of N (and, accordingly the number of department provided) will generally be much greater than four for a typical print production environment. Additionally, a path including $D_{2'}$ is shown in the example of FIG. 1 to suggest that there are multiple departmental processing paths that a given job could follow. For instance, in another example, $D_1$ could be a graphics department, $D_{2'}$ a prepress department, $D_{3'}$ (not shown) an offset press, and $D_N$ a finishing department. Finally, it is common (but not always the case) for one department to be separated from another department by a physical distance, and for the output of the one department (e.g., first output) to be physically delivered to the other department for processing or conversion into a second output. As will be understood, processing of a first output to obtain a second output might be predominantly electronic (such as the editing of an electronic master pursuant to a "makeready" process) or at least partly physical (such as the binding of an unbound hardcopy master to a bound master). Each staging area between two departments, or "interface," is designated with the numeral "20," followed by two numeric subscripts indicating "originating department/destination department."

In practice, a print job scheduling system could be used to assign the path that a given job might follow among the various print shop departments. A suitable job scheduling system could be constructed by reference to the disclosure of U.S. patent application Ser. No. 09/772,118 to Rai et al. (filed on Jan. 26, 2001, and published as 20020129081 on Sep. 12, 2002), the pertinent portions of which are incorporated herein by reference. Alternatively, a prescribed path for a given job might be programmed with the data tracking system 14. As should be noted, the data tracking system, which includes a database 22, communicates with both the job(s) 16, as well as all of print shop departments.

As will appear, the above-described document production platform 10, along with disclosed concepts below, can be used to obtain statistical descriptions of waiting time at departmental interfaces. By examination of the statistical description of the waiting times at the department interfaces, causes of job flow impediment(s) can be identified. The disclosed embodiments provide a methodology (for use with an automated tool) for calculating wait time statistics in a print shop. While the examples provided below are specific to an offset printing environment, it should be evident that the corresponding disclosure is applicable to a wide variety of print production environments.

To more fully comprehend the disclosed embodiments, an example directed to a document production environment including pre-press, offset press and bindery departments, is considered. Referring still to FIG. 1, as print jobs are communicated to the exemplary print shop, they are processed through various departments or stages and eventually exit the shop. By way of the data tracking system 14, a variety of operational data is collected in the database 22. The database can be obtained from vendors, such as Avanti or Logic. As operators perform their print shop tasks, they enter codes associated with each task and specify operational parameters with respect to these codes. Referring to the example of FIG. 2, a full range of data corresponding with print shop operation can be extracted from the database.

In the example of FIG. 2, each row contains information related to a job (specified by a job number), a task, the cost center on which the task was performed, the quantity associated with the job number, the code of the employee who performed the task, the cost associated with performing the task, the start time of the task and the end time, the start date of the task and the end date.

Referring to FIG. 3, shop task information is arranged hierarchically. For instance, record 5 of FIG. 3 shows a department code (BD) for a bindery department, a category code (DP) for a duplo-collator and a cost center (MR1) for makeready task associated with the Duplo Collator. Similarly, the unit hourly (or per item) cost associated with various codes is also shown. As should appear, if an operator spends an hour performing Makeready on the Duplo Collator, then the cost to be captured would be $118.59. This is how the cost numbers are populated in the table shown in FIG. 2. Referring still to FIG. 3, cost center codes are identified as setup related or processing rate related. For instance, BDDRRT1 is a run-time processing rate code and BDDRMR1 is a makeready or setup code. Code related to setups may be filtered out to obtain average setup time.

From the data collected in FIG. 2, a cross-tab query can be used to identify the first start time of a job in a department. A similar query can be used to calculate the last stop time in the same department for the same job. Referring to FIG. 4, the output of the queries (copied into Excel) is shown. The results of FIG. 4 may be sorted by stop times. Now the waiting time from one department to another is the difference between the time when a job was completed in a department and when it was moved to the next department. For instance, Job 132836 finished its last activity in the GD (Graphics Design) department at Jul. 23, 2003 9:27 AM and the next operation in the PP (Prepress) department started at Jul. 28, 2003 11:11 AM. Thus the waiting time between GD and PP for the shop is (Jul. 28, 2003 11:11 AM-Jul. 23, 2003 9:27 AM)=73.23 h, measured in the hours that the shop is open between these two times.

The process for calculating these numbers was automated using the following tool, described in terms of the following code (written in "visual basic for applications:

```
Sub InterDeptTransitTime( )
With Worksheets("Sheet1")
    Count = .Cells(3, 8)
        For i = 3 To 29062
            If (.Cells(i, 8) = Count) Then
                .Cells(i, 9) = AvailHours(.Cells(i – 1, 6), .Cells(i, 3))
                .Cells(i, 10) = .Cells(i – 1, 2) & "->" & .Cells(i, 2)
            Else
Count = .Cells(i, 8)
            End If
        Next i
End With
End Sub
Public Function AvailHours(ByVal Arrival As Date, ByVal Due As Date) As Double
Dim HoursToSubtract As Double
Dim numOfDays As Integer
Dim TimeOffset As Double
OpenTime = #12:05:00 AM#  'Shop opens at this time of the day
CloseTime = #11:55:00 PM# 'Shop closes at this time of the day
        If (Weekday(Arrival) > 1 And Weekday(Arrival) < 7) Then
            If (Weekday(Due) > 1 And Weekday(Due) < 7) Then
                NumOfWeekends = GetNumOfWeekends(Arrival, Due)
                AvailDays = DateDiff("d", Arrival, Due)
                    If (AvailDays = 0) Then 'Job is due the same day
                        AvailHours = DateDiff("n", TimeValue(Arrival), TimeValue(Due)) / 60#
                        GoTo 10
                    Else
                        TimeOffset = Hour(Arrival) / 24# + Minute(Arrival) / (24# * 60#)
                        If (Hour(Arrival) / 24# > CloseTime) Then
                            Arrival = Arrival – TimeOffset + CloseTime
                        End If
                        If (Hour(Arrival) / 24# < OpenTime) Then
                            Arrival = Arrival – TimeOffset + OpenTime
                        End If
                        If (Hour(Arrival) / 24# > CloseTime) Then
                            Due = Due – TimeOffset + CloseTime
                        End If
                        If (Hour(Arrival) / 24# < OpenTime) Then
                            Due = Due – TimeOffset + OpenTime
                        End If
                        AvailHours = DateDiff("n", Arrival, Due) / 60#
                        AvailHours = AvailHours – NumOfWeekends * 48# 'Assuming
                                shop is closed on weekends
                        'Subtract closed hours on the arrival day after the shop closes
                        HoursAfterClose = DateDiff("n", CloseTime, "0:0:0 AM") / 60# + 24
                        'Subtract closed hours on due day prior to opening
                        HoursBeforeOpen = DateDiff("n", "0:0:0 AM", OpenTime) / 60#
                        'MsgBox AvailHours
```

```
            'MsgBox HoursBeforeOpen
            'Subtract closed hours on each intermediate day
            AvailHours = AvailHours – (DateDiff("d", Arrival, Due) –
                        NumOfWeekends * 2) * (HoursBeforeOpen +
                        HoursAfterClose)
                End If
            End If
        End If
10:
End Function
Public Function GetNumOfWeekends(Arrival As Date, Due As Date) As Integer
Dim tmp As Date
    GetNumOfWeekends = DateDiff("w", Arrival, Due)
    tmp = Arrival + GetNumOfWeekends * 7
    DueDay = Weekday(Due)
    tmpDay = Weekday(tmp)
    If (tmpDay > DueDay) Then ' i.e. there is an incomplete week including a
    weekend
        GetNumOfWeekends = GetNumOfWeekends + 1
    End If
End Function
Public Function CompareDates(ByVal dt1 As Date, ByVal dt2 As Date) As Integer
'Returns 0 if dates are same
'Returns –1 if dt1 < dt2
'Returns 1 if dt1 > dt2
Dim day1, day2, month1, month2 As Integer
    If (dt1 < dt2) Then
        CompareDates = –1
    ElseIf (dt1 > dt2) Then
        CompareDates = 1
    Else
        CompareDates = 0
    End If
End Function
Public Function GetStartDate(Columnid As Integer) As Date
End Function
Public Function GetEndDate(Columnid As Integer) As Date
End Function
Public Function GetNumberOfJobs(Columnid As Integer) As Integer
Dim i As Integer
i = 1
Do While IsEmpty(ActiveSheet.Cells(i, Columnid)) = False
    i = i + 1
Loop
GetNumberOfJobs = i – 2
End Function
Sub NumberOfDepartmentsVisited( )
With Worksheets("Sheet1")
    curjobid = .Cells(2, 1)
    jobid = curjobid
    Count = 0
For i = 2 To 33176
    If (.Cells(i, 1) = curjobid) Then
        Count = Count + 1
        GoTo 100
    End If
    curjobid = .Cells(i, 1)
    If (Count < > 1) Then
        For k = (i – Count) To (i – 1)
            .Cells(k, 8) = Count
        Next k
    End If
    Count = 1
100:
Next i
End With
End Sub
```

Referring to FIG. 5, output resulting from the use of the above-described tool is shown. Each time output is moved from one department to another, a "department transition" occurs. The department transition is coded by taking the department code of the "from" department and concatenating it with the "to" department. For instance, the notation "GD→PP" indicates that a job (with its attendant output) has been moved from Graphics Design department to Prepress department, and, as illustrated by FIG. 5, the wait time is 73.23 h. It should be noted that some of the wait times in FIG. 5 have negative values. The positive or negative sign is used in accordance with a convention to indicate direction in transit. Thus, for example, with respect to Job ID 133067 (row 8 in FIG. 5), the negative sign indicates that the direction of job flow or job transit is actually from BD to PP.

As should now appear, data relating to department transitions can be grouped by transit code, and the statistics for each transition can be computed. FIG. 6 shows how this is done in one implementation. The data is moved into Minitab and the basic statistics are used to group the output as shown in FIG. 6.

The output of FIG. 6 shows which departmental transitions occur more frequently. For example, jobs went from BD (bindery) to ZS (shipping) 2652 times, whereas jobs went from PR (press) to CC (copy center) only 11 times. The number of times a transition occurs, transition information, can be used to make decisions such as where to deploy transportation resources or even automate transportation. Transition related information can be used to more efficiently design the path between two departments, and provide inputs as to which departments should be kept physically in close proximity.

It should be appreciated that a large range of design activities, other than the few mentioned immediately above, can be suggested with the type of transition data collected in FIG. 6:

In one design activity, a spatial relationship between a first print job processing department and a second print job processing department may be changed.

In another design activity, at least a part of the first print job processing department may be consolidated with at least a part of the second print job processing department.

In yet another design activity, (1) the first and second print job processing departments, along with a third print job processing department, are located in a print production facility, (2) first and second sets of multiple outputs are processed at the first job processing departments, and (3) a change in workflow relationship between the first and second print job processing departments is achieved by routing at least one output of the second set of multiple outputs from the first print job processing department to the third print job processing department.

In yet another design activity, at least one piece of equipment may be added to one or both of a first set of one or more pieces of equipment and a second set of one or more pieces of equipment may be added, or the at least one piece of equipment may be deleted from one or both of the first set of one or more pieces of equipment and the second set of one or more pieces of equipment.

In another design activity, at least one print job processing function may be added to one or both of a first set of one or more print job processing functions and a second set of one or more print job processing functions, or deleted from one or both of the first set of one or more print job processing functions and the second set of one or more print job processing functions.

Referring still to FIG. 6, the wait time intervals between departments in conjunction with the # of instances of transition can be used to assess operation at the various interfaces (FIG. 1). Even though, for example, the median wait time between Prepress (PP) and Mail (ML) departments is shown (in FIG. 6) as being 24.1 h, the number of times that the wait time interval is $\geq 24.1$ h is only 29. Therefore focusing on improving the flow between these two departments may not have a significant overall impact on improving the throughput of the subject print shop. On the other hand, if the median wait time between Bindery (BD) and Shipping (ZS) of 10.4 h can be reduced, then print shop throughput can inevitably be improved since this median wait time is encountered 2652 times.

Figure 7:
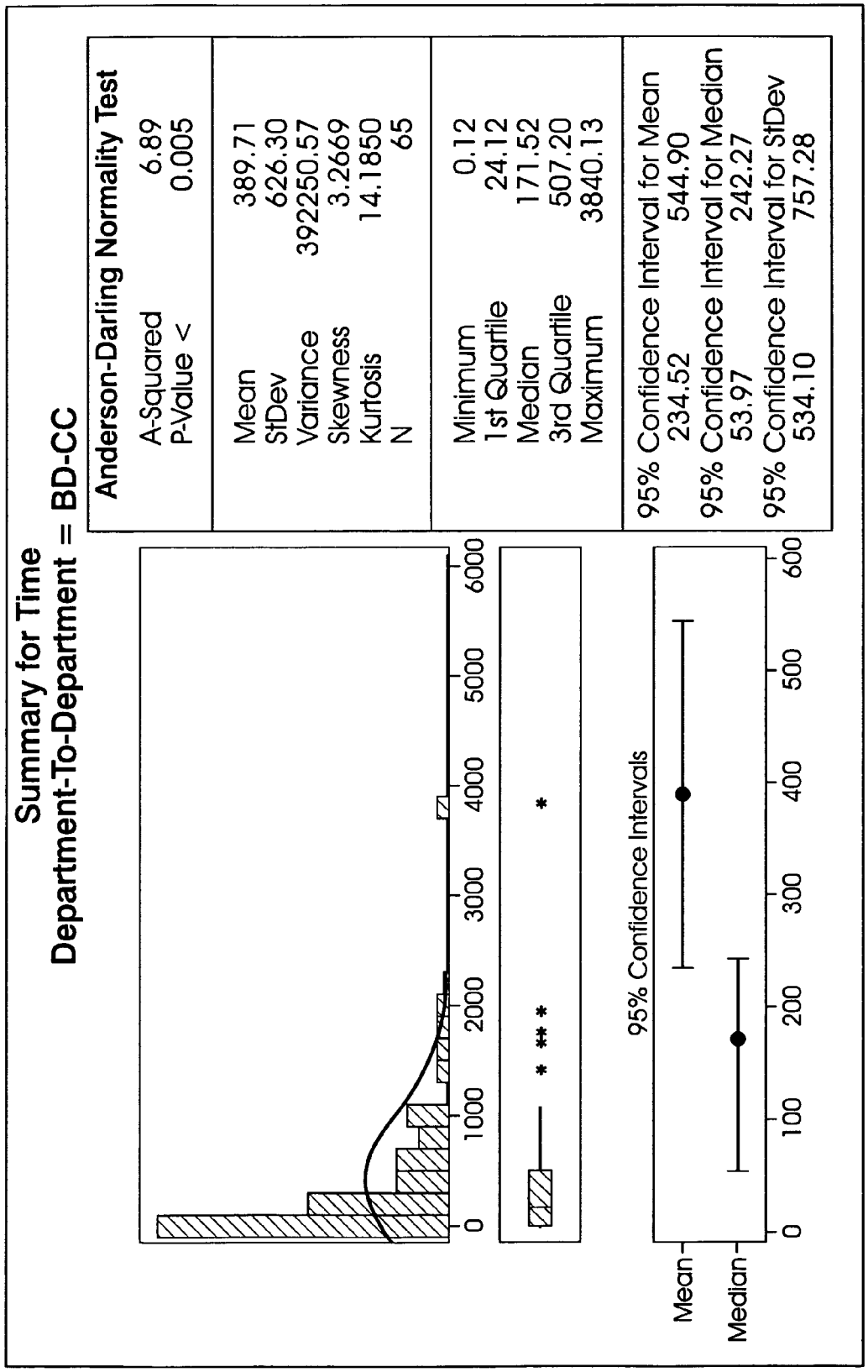
FIG. 7 is a planar view of a dialog screen showing a histogram and related statistics associated with a transition between two departments, namely a bindery (BD) and copy center (CC).

A selection of statistical metrics for wait time related data may be facilitated by performing a suitable statistical analysis for each collected set of transition data. Referring to FIG. 7, a histogram (based on collected data for a Bindery (BD)_Copy Center (CC) transition is shown. The histogram shows that the mean wait time between these two departments is not only high (389.7 h), but that the spread (standard deviation) is also high. The coefficient of variation $C_v$ of 1.6 (626/389=1.6) can be computed for distributions of the type shown in FIG. 7, and the resulting high $C_v$ points to a need for effective control of processes associated with the subject BD_CC transition. It can be appreciated that the distribution of FIG. 7 (along with comparable datasets for other transitions of the print shop) can be computed and used for analytical workflow modeling studies.

The analysis of print shop transitions described above can be used in identifying "bottlenecks" in print shops. With a disclosed automated tool for computing wait time intervals, demands for improvement in workflow and/or departmental processing capability can be readily ascertained. Further aspects of the disclosed embodiments follow from the above description:

A statistical metric representative of wait time interval may be selected from a set of two or more statistical metrics. In one example, the statistical metric is selected by performing a statistical analysis on a group of stored wait time intervals. In another example, the statistical metric comprises a median time spent waiting between a first print job processing department and a second print job processing department. In yet another example, the set of two or more statistical metrics includes a standard deviation.

Changes in a workflow relationship of a first print job processing department and a second print job processing department, or changes in a job processing capability of one or both of the first and second print job processing departments can be facilitated by the use of a report. In one example, the report includes both a total number of instances an output is delivered from the first print job processing department to the second print job processing department, and the wait time intervals corresponding with the total number of instances.

It will be appreciated that various ones of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A system for use in a print production facility having a first print job processing department separated spatially from a second print job processing department and a department interface between the first print job processing department and the second print job processing department, wherein a set of print jobs are processed at the first print job processing department to obtain a set of multiple outputs and each one of the multiple outputs is delivered individually from the first print job processing department to the second print job processing department for processing at the second print job processing department, and wherein a workflow relationship exists as one of multiple departmental processing paths that a given one of the set of print jobs can follow between the first print job processing department and the second print job processing department, comprising:

(A) a print job delivery tracking tool adapted to:
receive codes corresponding to a transition for each instance in which one of the multiple outputs is delivered from the first print job processing department to the second print processing department;

obtain a statistical description of a wait time interval at the department interface by using the codes to identify a first time for completing processing of one of the multiple outputs at the first print job processing department and a second time for beginning processing of the same one of the multiple outputs at the second print job processing department and computing a difference between the second time and the first time;

(B) a memory for storing a total number of determined instances of transition between the first and second processing departments with their corresponding wait time intervals; and (C) a processor adapted to:
use the wait time interval to compute a statistical metric value representative of a wait time interval for the set of multiple outputs;
compare the statistical metric value to a reference value for identifying a job flow impediment; and
use results of the comparison for determining a select alternate one of the multiple departmental processing paths for the given one of the set of print jobs; and, provide an indication to alter the workflow relationship based on the select alternate path.

2. The system of claim 1, in which (1) the print production facility includes a third print job processing department, (2) the set of print jobs comprises a first set of print jobs, (3) the set of multiple outputs comprises a first set of multiple outputs, and (4) a second set of print jobs is processed at the first print job processing department to obtain a second set of multiple outputs, wherein the processor is further adapted to provide an indication to change the path of at least one of the second set of multiple outputs to that from the first job processing department to the third print job processing department.

3. The system of claim 1, further comprising:
(D) a screen for providing a report, including both the total number of instances and the statistical metric value used by the processor to perform (C).

4. An article of manufacture for a print production facility having a first print job processing department separated spatially from a second print job processing department and a department interface between the first print job processing department and the second print job processing department, wherein a set of print jobs are processed at the first print job processing department to obtain a set of multiple outputs and each one of the multiple outputs is delivered individually from the first print job processing department to the second print job processing department for processing at the second print job processing department, and wherein a workflow relationship exists as one of multiple departmental processing paths that a given one of the set of print jobs can follow between the first print job processing department and the second print job processing department, the article of manufacture comprising a non-transitory computer usable media including computer readable instructions embedded therein for causing a computer to perform a method, the method comprising:

receiving codes corresponding to a transition for each instance in which one of the multiple outputs is delivered from the first print job processing department to the second print job processing department;

obtaining a statistical description of a wait time interval at the department interface, including:
using the codes to identify a first time for completing processing of one of the multiple outputs at the first print job processing department and a second time for beginning processing of the same one of the multiple outputs at the second print job processing department, and
computing a difference between the second time and the first time;
for a data set of at least two wait time intervals and a corresponding number of instances of transition between the first and second processing departments, computing a statistical metric value representative of a wait time interval for the set of multiple outputs;
using the statistical metric value to identify job flow impediments at the department interface, including:
determining if at least the statistical metric value exceeds a selected reference value; and,
assigning an alternate path for each one of the set of print jobs to follow if a job flow impediment is identified at the department interface.

5. The article of manufacture of claim 4, wherein the statistical metric that is representative of the wait time interval includes a standard deviation for wait times between the first print job processing department and the second print job processing department.

6. The article of manufacture of claim 5, wherein the statistical metric comprises a median time spent waiting between the first print job processing department and the second print job processing department.

7. The article of manufacture of claim 4, wherein the article of manufacture comprises portable memory media and the method is performed on one of a plurality of computers.

8. The article of manufacture of claim 4, wherein the indication is obtained with a report including both the total number of instances and the statistical metric value is used to perform the statistical method.

9. A method for use in a print production facility having a first print job processing department separated spatially from a second print job processing department and a department interface between the first print job processing department and the second print job processing department, wherein a set of print jobs are processed at the first print job processing department to obtain a set of multiple outputs and each one of the multiple outputs is delivered individually from the first print job processing department to the second print job processing department, and wherein a workflow relationship exists as one of multiple departmental processing paths that a given one of the set of print jobs can follow between the first print job processing department and the second print job processing department, comprising:

(A) receiving codes corresponding to a transition for each instances in which one of the multiple outputs is delivered from the first print job processing department to the second print job processing department;

(B) obtaining a statistical description of a wait time interval at the department interface between the first print job processing department and the second print job processing department, the obtaining including:
(i) using the codes to identify a first time for completing processing of one of the multiple outputs at the first print job processing department and a second time for beginning processing of the same one of the multiple outputs at the second print job processing department and,
(ii) computing a difference between the second time and the first time;

(C) for a data set of at least two wait time intervals and a corresponding number of instances, computing a statistical metric value representative of a wait time interval for the set of multiple outputs;

(D) using the statistical metric value of identify job flow impediments at the department interface by determining if at least the statistical metric value exceeds a selected reference value; and, (E) assigning an alternate path for each one of the set of print jobs to follow if a job flow impediment is identified at the department interface.

10. The method of claim 9, in which (1) the print production facility includes a third print job processing department, (2) the set of print jobs comprises a first set of print jobs, (3) the set of multiple outputs comprises a first set of multiple outputs, and (4) a second set of print jobs is processed at the first print job processing department to obtain a second set of multiple outputs, wherein the (E) further includes providing an indication to route at least one of the outputs of the second set of multiple outputs to the third print job processing department.

11. The method of claim 9, further comprising:
(C) selecting the statistical metric from a set of two or more statistical metrics wherein the (C) comprises selecting a standard deviation from the set of two or more statistical metrics.

12. The method of claim 11, wherein the (C) includes selecting the statistical metric by performing a statistical analysis on the wait time intervals stored in memory.

13. The method of claim 11, wherein the (C) comprises selecting a median time spent waiting between the first print job processing department and the second print job processing department.

14. The method of claim 9, wherein the (B) includes determining each wait time interval with an automated tool.

15. The method of claim 10, further comprising:
(F) generating a report including both the total number of determined instances and the statistical metric value; and
(G) using the report to generate the indication of (E).

16. The method of claim 1, wherein the indication to alter the workflow relationship comprises a change in the spatial relationship between the first print job processing department and the second print job processing department including at least a partial consolidation of a part of the first print job processing department and the second print job processing department whereby transition related information can be used to efficiently design the path between the first and second processing departments.

17. The article of manufacture of claim 4, wherein the assigning the path comprises an indication to change the spatial relationship between the first print job processing department and the second print job processing department including at least a partial consolidation of a part of the first print job processing department and the second print job processing department, whereby transition related information can be used to efficiently design the path between the first and second processing departments.

18. The method of claim 9, wherein the assigning the path comprises an indication to change the spatial relationship between the first print job processing department and the second print job processing department including at least a partial consolidation of a part of the first print job processing department and the second print job processing department whereby transition related information can be used to efficiently design the path between the first and second processing departments.

* * * * *